United States Patent
Jeoung et al.

(10) Patent No.: US 7,671,956 B2
(45) Date of Patent: Mar. 2, 2010

(54) LIQUID CRYSTAL DISPLAY PANEL AND FABRICATING METHOD THEREOF

(75) Inventors: Hun Jeoung, Gyeongsangbuk-do (KR); Young Hak Lee, Gumi-si (KR)

(73) Assignee: LG Display Co., Ltd, Seoul (KR)

( * ) Notice: Subject to any disclaimer, the term of this patent is extended or adjusted under 35 U.S.C. 154(b) by 730 days.

(21) Appl. No.: 11/471,655

(22) Filed: Jun. 21, 2006

(65) Prior Publication Data

US 2007/0109483 A1    May 17, 2007

(30) Foreign Application Priority Data

Nov. 17, 2005    (KR) .................... P2005-0110207

(51) Int. Cl.
*G02F 1/1368*    (2006.01)
*G02F 1/1345*    (2006.01)

(52) U.S. Cl. .................... 349/149; 349/122; 349/187

(58) Field of Classification Search .............. 349/42, 349/43, 139, 149–152, 187, 122; 257/59, 257/72; 345/87, 92; 438/30

See application file for complete search history.

(56) References Cited

U.S. PATENT DOCUMENTS 7,248,323 B2 *    7/2007    Ahn et al. ................ 349/141
7,528,921 B2 *    5/2009    Ahn et al. ................ 349/153

\* cited by examiner

*Primary Examiner*—Dung Nguyen
*Assistant Examiner*—Tai Duong
(74) *Attorney, Agent, or Firm*—McKenna Long & Aldridge

(57) ABSTRACT

A liquid crystal display panel and a fabricating method thereof for minimizing a resistance of a silver dot caused by thickness of a silver dot and preventing distortion of a common voltage are disclosed. In the liquid crystal display panel, a common pad may be formed on a first substrate. A common electrode supplies a common voltage through a common pad to a second substrate opposite to the first substrate. A conductive dot is substantially formed between the common electrode and the common pad to electrically connect the common electrode and common pad. An organic protective film minimizes conductive dot height on the first substrate at an area substantially corresponding to the common pad.

18 Claims, 11 Drawing Sheets

LIQUID CRYSTAL DISPLAY PANEL AND FABRICATING METHOD THEREOF

This application claims the benefit of Korean Patent Application No. P2005-0110207, filed on Nov. 17, 2005, which is hereby incorporated by reference for all purposes as if fully set forth herein.

BACKGROUND OF THE INVENTION

1. Field of the Invention

The present invention relates to a liquid crystal display panel and a fabricating method thereof, and more particularly to a liquid crystal display panel and a fabricating method thereof that minimize silver dot resistance and prevent common voltage distortion.

2. Discussion of the Related Art

Generally, a liquid crystal display (LCD) device has liquid crystal cells that may be arranged in a matrix. LCDs control light transmittance in accordance with a video signal. Therefore, LCDs display a picture corresponding to the video signal.

Such a liquid crystal display panel may include a thin film transistor substrate and a color filter substrate joined by an adhesive and having liquid crystal material therebetween.

The color filter substrate may include a black matrix for preventing light leakage, a color filter for realizing color, a common electrode for forming an electric field with an opposing pixel electrode and an upper alignment film coated thereon to initially align the liquid crystal molecules.

The thin film transistor substrate may include a gate line and a data line crossing each other on a lower substrate, a thin film transistor (TFT) formed at an intersection thereof, a pixel electrode connected to the thin film transistor and a lower alignment film coated thereon to initially align the liquid crystal molecules.

A liquid crystal display panel of the related art may include an organic protective film formed of a photo acryl and BCB (benzocyclobutene), for example, in order to increase the aperture ratio of a display area. However, a problem arises in that the organic protective film and an adhesive easily separate because of a weak contact force between the organic protective film and the adhesive. To solve this problem, the organic protective film should be formed within the display area excluding a dot area where a silver dot is deposited and a joining area where adhesives are deposited. Accordingly, a common pad may be formed to have a similar structure as shown in the related art of FIG. 1 as it is connected to the silver dot at the dot area and supplies a common voltage to a common electrode provided on an upper substrate.

Figure 1:
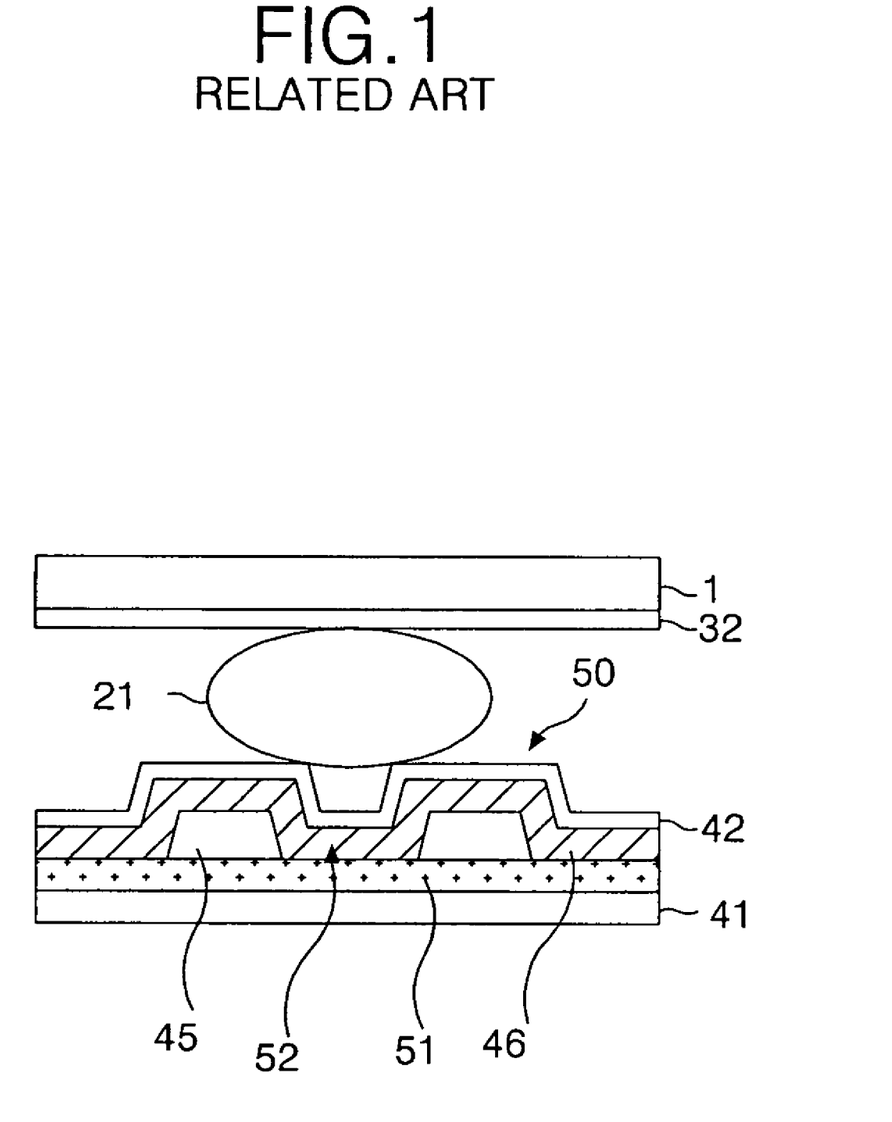
FIG. 1 is a sectional view showing a dot area of a related art liquid crystal display panel.

Referring to related art FIG. 1, a common pad 50 includes a lower pad electrode 51 formed on a lower substrate 41, a pad contact hole 52 passes through an inter layer dielectric 45 to expose the lower pad electrode 51, a middle pad electrode 46 connected through the pad contact hole 52 and to the lower pad electrode 51, and an upper pad electrode 42 directly contacting the middle pad electrode 46.

Accordingly, since the organic protective film is not formed at the dot area, a distance (or "gap") between common electrodes 32 provided on the upper substrate 1 and an upper pad electrode 42 is large. For example, if a thickness of the organic protective film is about 2.3 µm, a thickness of a spacer is about 4.75 µm and a thickness of a color filter is about 1.7 µm, the space (height) for the dot area becomes approximately 9.0 µm. In such a space, a silver dot 21 should be deposited for electrically connecting the upper pad electrode 42 and the common electrode 32. In such a situation, if the size of silver dot 21 is too small, electrical contact between the silver dot 21 and the upper pad electrode 42 or the common electrode 32 is incomplete. Therefore, electrical resistance at the silver dot 21 is increased, and common voltage signal distortion is generated by such resistance. Inferior picture quality results from the signal distortion. Particularly, in line inversion driving, since a common voltage signal is applied to an alternative signal, a distortion of the common voltage because of resistance upon application of the common voltage to a common electrode is generated. Accordingly, poor picture quality results. Further, it is difficult to vary the size of the silver dot given space limitations of the dot area.

SUMMARY OF THE INVENTION

Accordingly, the present invention is directed to a liquid crystal display panel and fabricating method thereof that minimize electrical resistance of a silver dot and prevent distortion of a common voltage.

An advantage of the present invention is to provide a liquid crystal display panel and fabricating method thereof that minimize height of a silver dot necessary to completely electrically connect the silver dot and an electrode.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, the liquid crystal display panel according to the present invention comprises: a common pad formed on a first substrate; a common electrode supplied with a common voltage through the common pad, on a second substrate opposite to the first substrate; a conductive dot formed between the common electrode and the common pad to be electrically connected to each other; and an organic protective film that minimizes a height of a space between the commmon pad and the common electrode.

The common pad may include a first pad electrode formed on the first substrate; the organic protective film substantially covering the first pad electrode; a first pad contact hole passing through the organic protective film to expose the first pad electrode; and a second pad electrode connected, through the first pad contact hole, to the first pad electrode, and that is formed on the organic protective film.

At least one first pad contact hole may be formed at an area overlapping with the conductive dot.

At least one first pad contact hole may be formed at a non-overlapping area of the conductive dot.

The first pad contact hole may substantially expose an edge of the first pad electrode.

The common pad may further include a third pad electrode substantially between the first substrate and the first pad electrode; at least one insulating layer to cover the third pad electrode; and a third common contact hole passing through the insulating layer to be connected to the first pad electrode and the third pad electrode.

The liquid crystal display panel may further comprise a pixel electrode to provide a substantially vertical electric field along with the common electrode on the first substrate; a thin film transistor connected to the pixel electrode, and that is protected by the organic protective film; a gate line connected to a gate electrode of the thin film transistor; and a data line connected to a source electrode of the thin film transistor.

At least one insulating layer may be formed between the gate line and the data line.

The liquid crystal display panel may further comprise an adhesive for joining the first substrate and the second substrate, and wherein the organic protective film is formed on the first substrate at an area other than that of the adhesive.

In another aspect of the present invention, there is provided a method of fabricating a liquid crystal display panel, comprising the steps of: preparing a color filter substrate including a common electrode formed on an upper substrate; preparing a thin film transistor substrate including an organic protective film formed at another area other than an area in which the upper substrate and the lower substrate are joined together, a pixel electrode opposite the common electrode on the organic protective film, and a common pad formed on the organic protective film, and for supplying a common voltage to the common electrode; and forming a conductive dot for connecting the common electrode and the common pad between the thin film transistor substrate and the color filter substrate wherein the organic protective film narrows a distance between the common electrode and common pad.

In the method, said step of preparing the thin film transistor substrate may include forming a first pad electrode on the lower substrate; forming the organic protective film to substantially cover the first pad electrode; forming a first pad contact hole passing through the organic protective film to expose the first pad electrode; and forming a second pad electrode connected, through the first pad contact hole, to the first pad electrode, and connected to the conductive dot on the organic protective film.

In the method, at least one first pad contact hole may be formed at an area overlapping the conductive dot.

In the method, at least one first pad contact hole may be formed at a non-overlapping area of the conductive dot.

In the method, said first pad contact hole may substantially expose an edge of the first pad electrode.

The method may further comprise the steps of forming a third pad electrode substantially between the first substrate and the first pad electrode; forming at least one insulating layer to substantially cover the third pad electrode; forming a third common contact hole passing through the insulating layer to be connected to the first pad electrode and the third pad electrode.

In the method, said step of preparing the thin film transistor substrate may further include forming a gate line connected to a gate electrode of a thin film transistor; and forming a data line connected to a source electrode of the thin film transistor.

In the method, at least one insulating layer may be formed between the gate line and the data line.

The method may further comprise the step of joining the thin film transistor substrate with the color filter substrate using an adhesive formed at an area not overlapping with the organic protective film.

The method may further comprise the steps of: forming a third pad electrode substantially between the first substrate and the first pad electrode; forming at least one insulating layer to substantially cover the third pad electrode; and forming a third pad contact hole passing through the insulating layer to connect the first pad electrode and the third pad electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Hereinafter, the preferred embodiments of the present invention will be described in detail with reference to FIG. 2 through and including FIG. 5.

Figure 2:
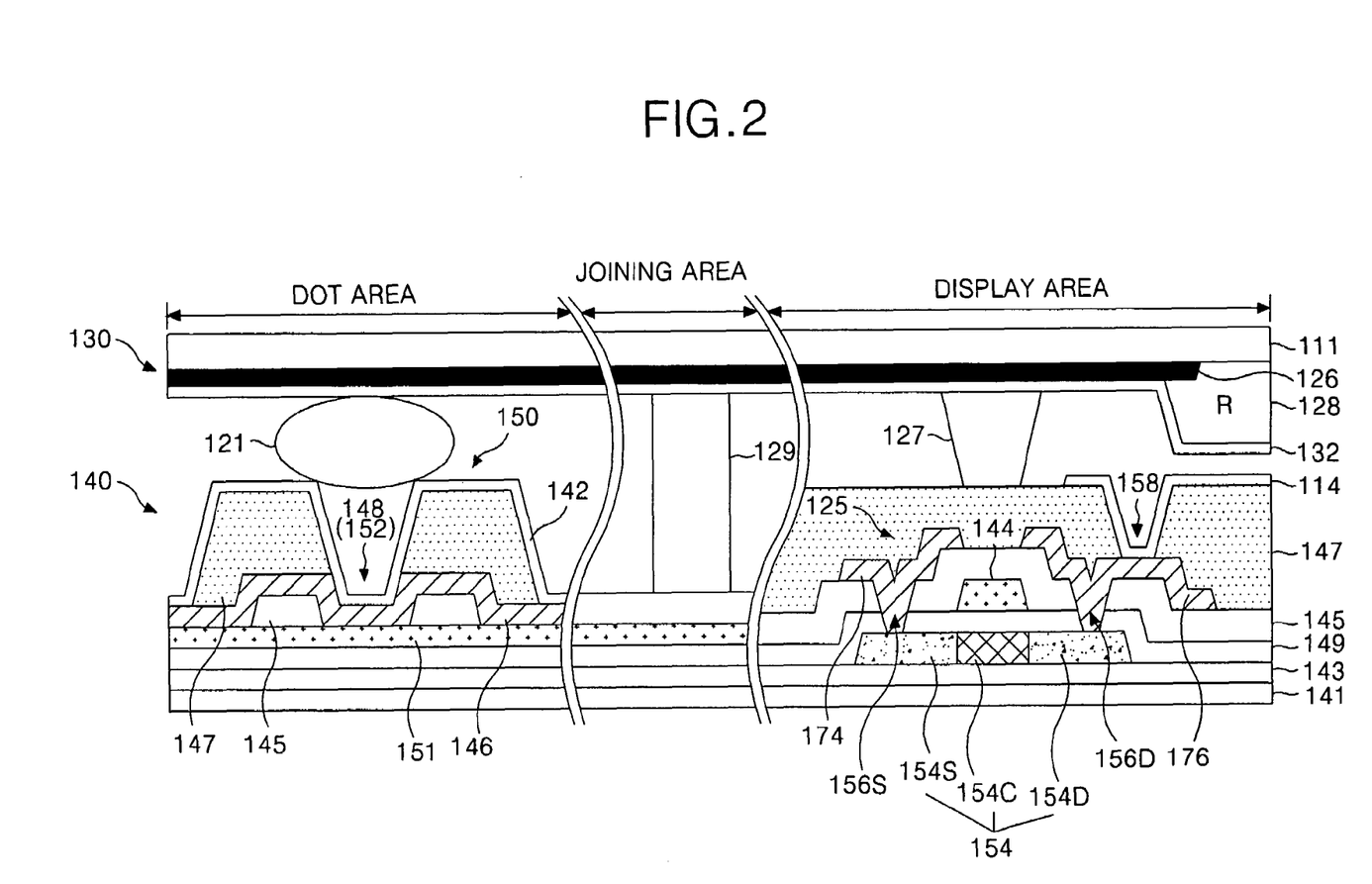
FIG. 2 is a sectional view showing a structure of a liquid crystal display panel according to an embodiment of the present invention.

FIG. 2 is a sectional view showing a structure of a liquid crystal display panel according to an embodiment of the present invention.

Referring to FIG. 2, a liquid crystal display panel according to this embodiment of the present invention includes a color filter substrate 130, a thin film transistor substrate 140 joined with the color filter substrate 130 by an adhesive 129, and a silver dot 121 for supplying a common voltage to a common electrode 132 of the color filter substrate 130.

In the color filter substrate 130, a black matrix 126 for preventing light leakage, a color filter 128 for producing color and a common electrode 132 that forms a substantially vertical electric field along with a pixel electrode 114 are formed on an upper substrate 111. Also, in the color filter substrate 130, a column spacer 127 for maintaining a cell gap between the color filter substrate 130 and the thin film transistor substrate 140 is formed at an area overlapping with the black matrix 126.

In the thin film transistor substrate 140, a TFT 125 is connected to a gate line and a data line (both not shown), and a pixel electrode 114 is connected to the TFT 125 on a lower substrate 141. The TFT 125 may be an 'N' type or 'P' type. Presently, an 'N' type TFT will be described.

The TFT 125 charges a video signal into the pixel electrode 114. The TFT 125 includes a gate electrode 144 connected to a gate line (not shown), a source electrode 174 connected to a data line and a drain electrode 176 connected via a pixel contact hole 158 passing through the pixel electrode 114 and an organic protective film 147. The gate electrode 144 overlaps with a channel area 154C of an active layer 154 provided on a buffer layer 143 having a gate insulating film 149 therebetween. The source electrode 174 and the drain electrode 176 are insulated from the gate electrode 144 by an inter layer dielectric 145 therebetween. The source electrode 174 and the drain electrode 176 are connected through a source contact hole 156S and a drain contact hole 156D passing through the inter layer dielectric 145 and the gate insulating film 149, to a source area 154S and a drain area 154D of the active layer 154 injected with an n⁺ impurity. Also, the active layer 154 further includes an LDD (Lightly Doped Drain) area (not shown) and injected with an n⁻ impurity among the channel area 154C, and the source and the drain areas 154S and 154D.

The pixel electrode 114 is positioned at a pixel area arranged by the crossing of a data line and a gate line and may be formed of a transparent conductive material having a high transmittance. The pixel electrode 114 may be formed on the organic protective film 147, and electrically connected, through the pixel contact hole 158, to the drain electrode 176. Potential difference between the pixel electrode 114 and the common electrode 132 is generated by a data signal supplied by the TFT 125. Liquid crystal molecules are rotated due to the potential difference. Light transmittance varies depending upon the rotation of the liquid crystal molecules.

The organic protective film 147 may be formed of an organic insulating material such as an acryl and BCB (benzocyclobutene), and other suitable materials. Generally, such materials are used for increasing aperture ratio and to protect the thin film transistor 125. Such organic protective film 147 may be formed at another area other than the adhesive 129 area because a contact force between the organic protective film 147 and the adhesive 129 formed at a joining area may be weak. The organic protective film 147 reduces the distance between the upper pad electrode 142 and the common electrode 132, and reduces the surface area of the silver dot 121 provided between the upper pad electrode 142 and the common electrode 132 in the dot area. In other words, silver dot 121 width and height may be reduced as much as the organic protective film 147 width and height formed at the dot area.

The silver dot 121 electrically connects the common electrode 132 formed on the upper substrate 111 to the common pad 150 formed on the lower substrate 141. The silver dot 121 may be deposited within the dot area. When the upper substrate 111 and the lower substrate 141 are together, the silver dot 121 is pressed and the surface of the silver dot 121 completely contacts the common electrode 132 and the common pad 150.

The common pad 150 may include a lower pad electrode 151 formed on the gate insulating film 149, a first pad contact hole 152 passing through the inter layer dielectric 145 to expose the lower pad electrode 151, a middle pad electrode 146 connected, through the first pad contact hole 152, to the lower pad electrode 151, a second pad contact hole 148 passing through the organic protective film 147 to expose the middle pad electrode 146 and the upper pad electrode 142 connected, through the second pad contact hole 148, to the middle pad electrode 146.

The lower pad electrode 151 and the middle pad electrode 146 may be formed of a metal having a high conductivity to compensate for resistance of the upper pad electrode 142, which may be formed of a transparent conductive material such as ITO which has a high resistance. For example, the lower pad electrode 151 may be formed of the same metal as the gate line on the same plane, and the middle pad electrode 146 may be formed of the same metal as the data line on the same plane.

When the upper pad electrode 142 contacts the silver dot 121 when the upper substrate 111 and the lower substrate 141 are compressed, a common voltage can be applied to the common electrode 132 from a common voltage generator (not shown).

As described above, in the liquid crystal display panel according to this embodiment of the present invention, the organic protective film 147 may be formed at an area overlapping the silver dot 121. A distance between the upper pad electrode 142 and the common electrode 132 may be narrowed by the thickness of the organic protective film 147. Therefore, the silver dot 121 may be pressed completely when joining the upper substrate 111 and the lower substrate 141. As a result, the silver dot 121 contact surface to the common electrode 132 and the pad upper electrode 142 is maximized. It is then possible to minimize the contact resistance of the silver dot 121, so that distortion of the common voltage is eliminated.

A method of fabricating the liquid crystal display panel according to an embodiment of the present invention having the aforedescribed structure will be described in detail with reference to FIG. 3A through and including FIG. 3G Referring to FIG. 3A, a buffer layer 143 is formed on the lower substrate 141, and an active layer 154 is formed on the buffer layer 143.

An inorganic insulating material such as SiO₂, or other suitable material, is entirely disposed on the lower substrate 141, thereby comprising the buffer layer 143.

After an amorphous-silicon material is disposed on the buffer layer 143, then the amorphous-silicon material may be crystallized by laser, thereby resulting in a poly-silicon. Next, the poly-silicon may be patterned by photolithography and etching, thereby resulting in the active layer 154.

Figure 3A:
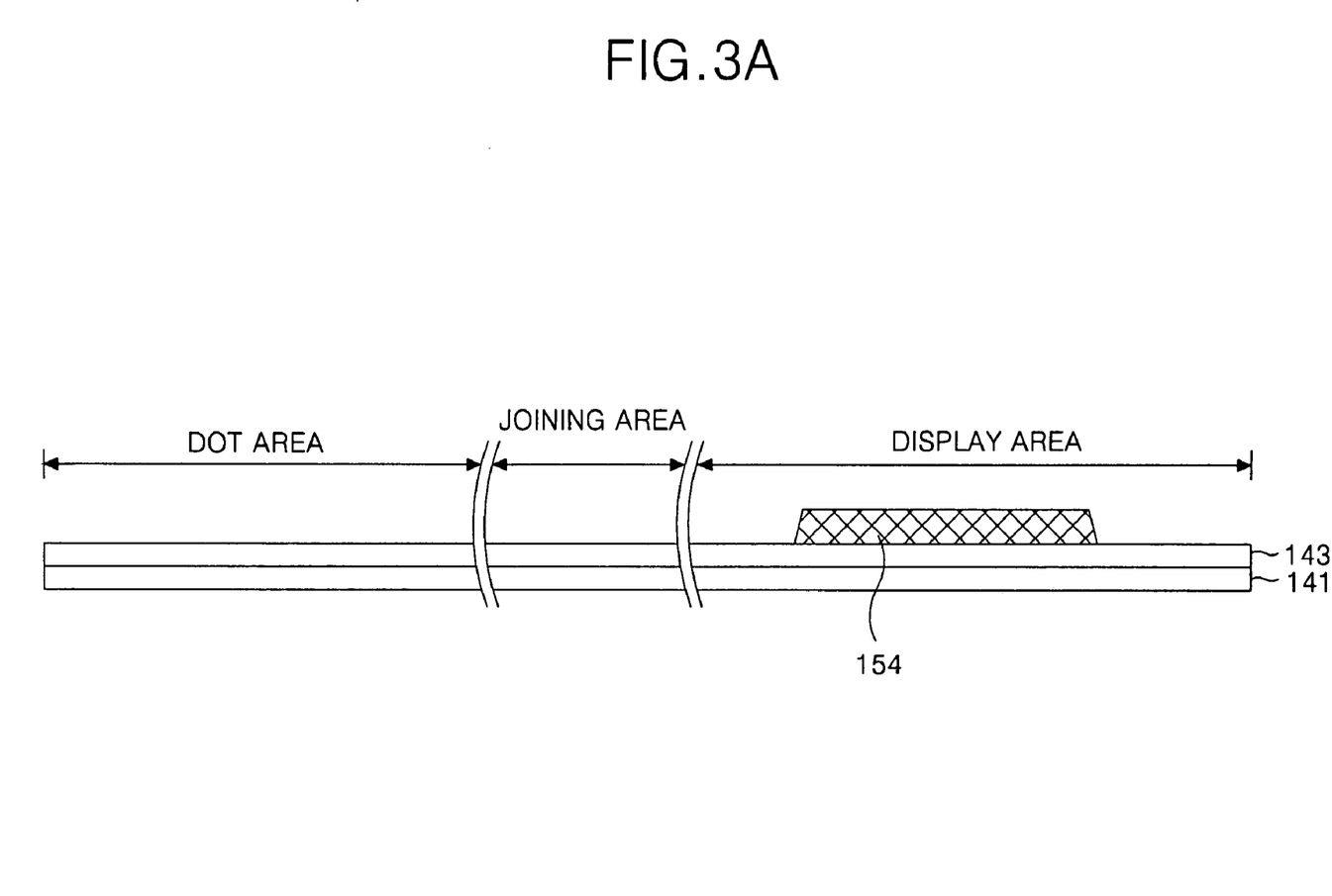
FIGS. 3A through and including FIG. 3G are sectional views showing a step-by-step method of fabricating the liquid crystal display panel as illustrated in FIG. 2.
Figure 3B:
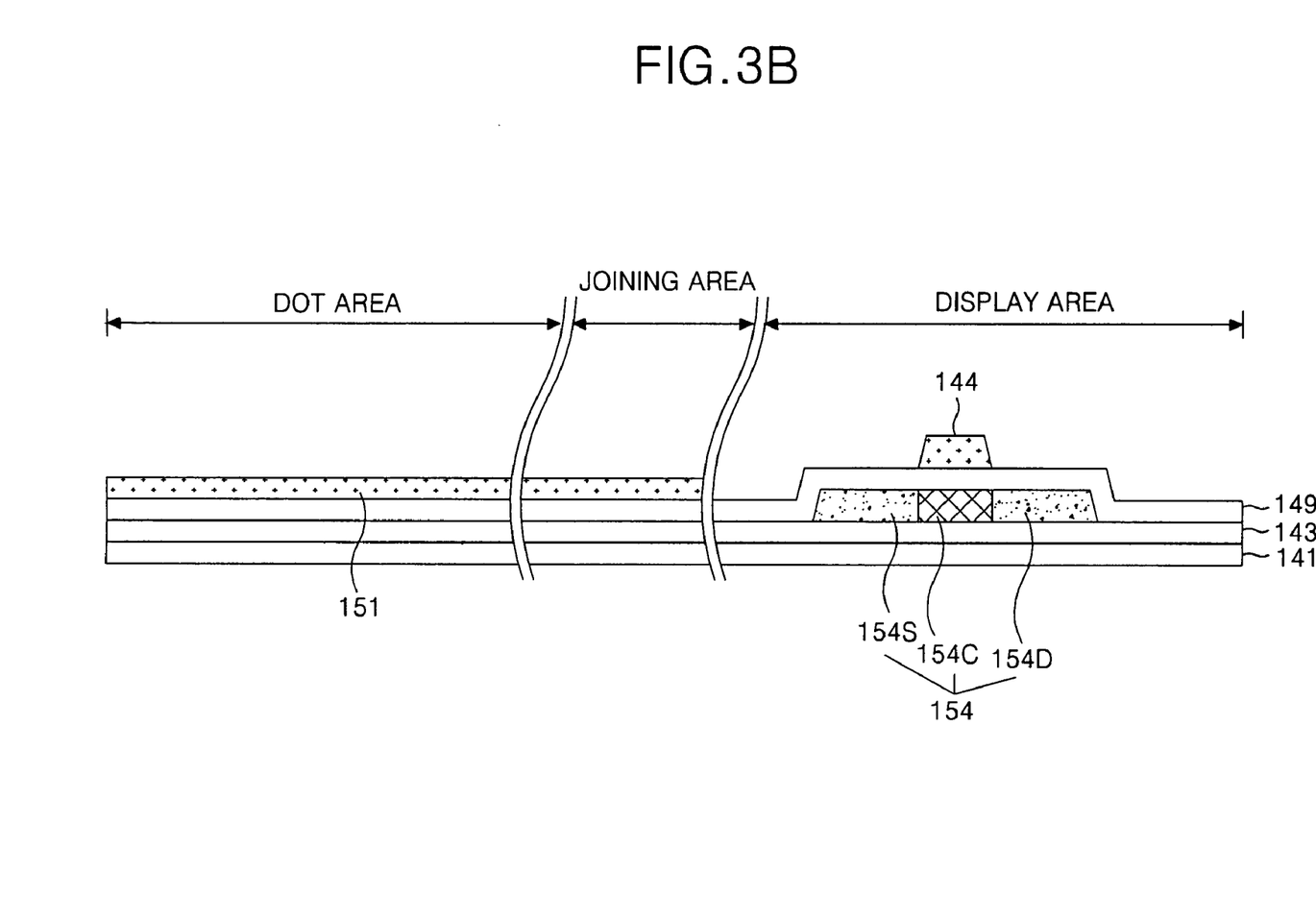

Referring to FIG. 3B, the gate insulating film 149 is formed on the buffer layer 143 provided with the active layer 154, and a first conductive pattern group including the gate electrode 144, the gate line and the lower pad electrode 151 may be formed thereon.

The inorganic insulating material such as SiO₂, or other suitable material may be entirely disposed on the buffer layer 143 provided with the active layer 154, thereby resulting in the gate insulating film 149.

After a gate metal layer is formed on the gate insulating film 149, the gate metal layer may be patterned by photolithography and etching, thereby resulting in the first conductive pattern group including the gate electrode 144, the gate line and the lower pad electrode 151.

The n⁺ impurity may be injected into the active layer 154 by using the gate electrode 144 as a mask, thereby resulting in the source area 154S and the drain area 154D of the active layer 154 not overlapped with the gate electrode 144. The source area 154S and the drain area 154D of the active layer 154 oppose each other and have a channel area 154C overlapped with the gate electrode 144 between the source and drain areas, 154S and 154D.

Figure 3C:
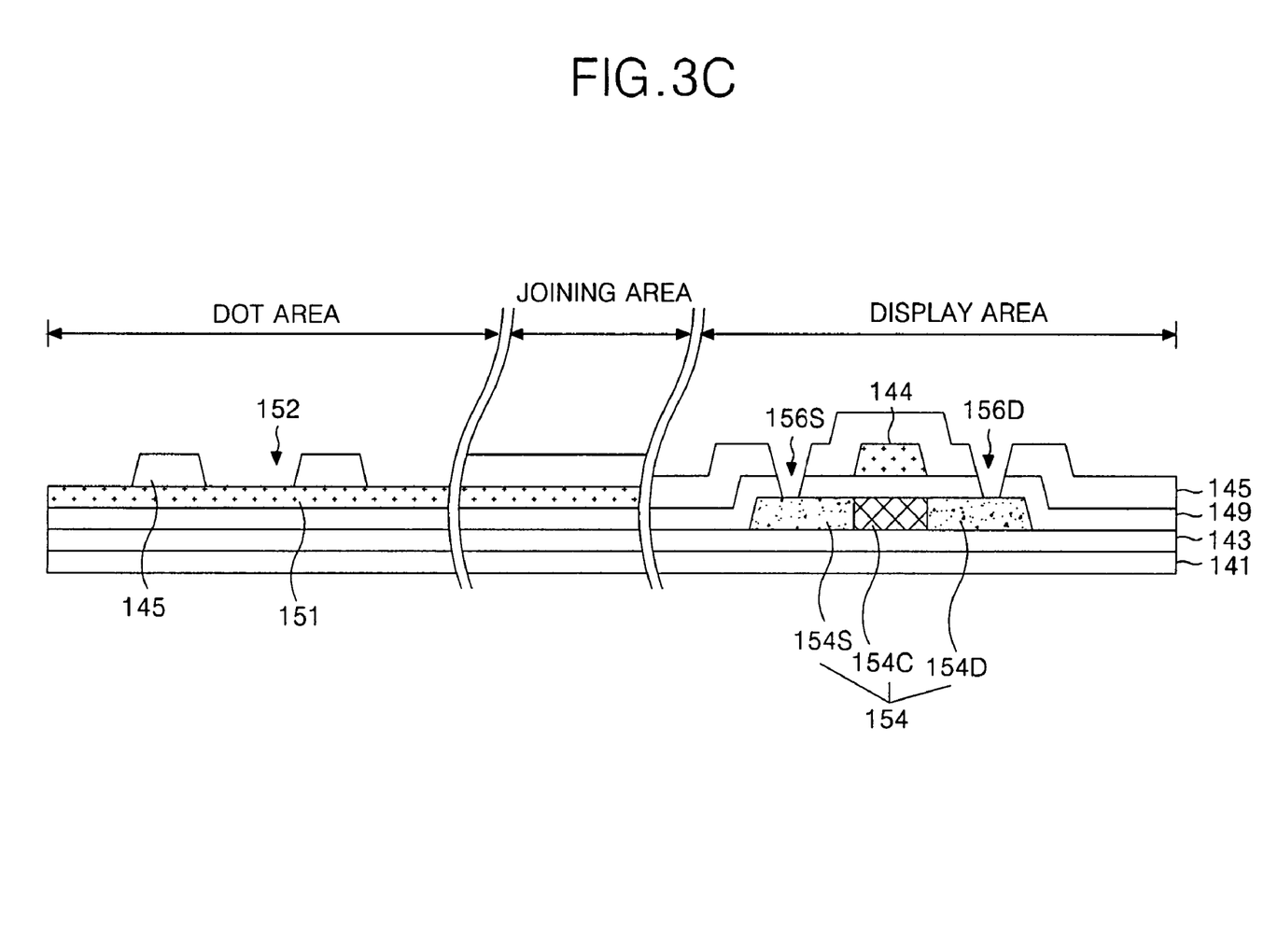

Referring to FIG. 3C, the inter layer dielectric 145, the source and the drain contact holes 156S and 156D passing through the inter layer dielectric 145 and the gate insulating film 149, and the first pad contact hole 152 passing through the inter layer dielectric 145 may be formed on the gate insulating film 149 provided with the first conductive pattern group.

The inorganic insulating material such as SiO₂, or other suitable material, may be entirely disposed on the gate insulating film 149 provided with the first conductive pattern group, thereby resulting in the inter layer dielectric 145.

Next, the source and the drain contact holes 156S and 156D passing through the inter layer dielectric 145 and the gate insulating film 149, and the first pad contact hole 152 passing through the inter layer dielectric 145 may be formed by photolithography and etching. The source and the drain contact holes 156S and 156D pass through the inter layer dielectric 145 and the gate insulating film 149 to expose the source area 154S and the drain area 154D of the active layer 154. The first pad contact hole 152 passes through the inter layer dielectric 145 to expose the lower pad electrode 151.

Figure 3D:
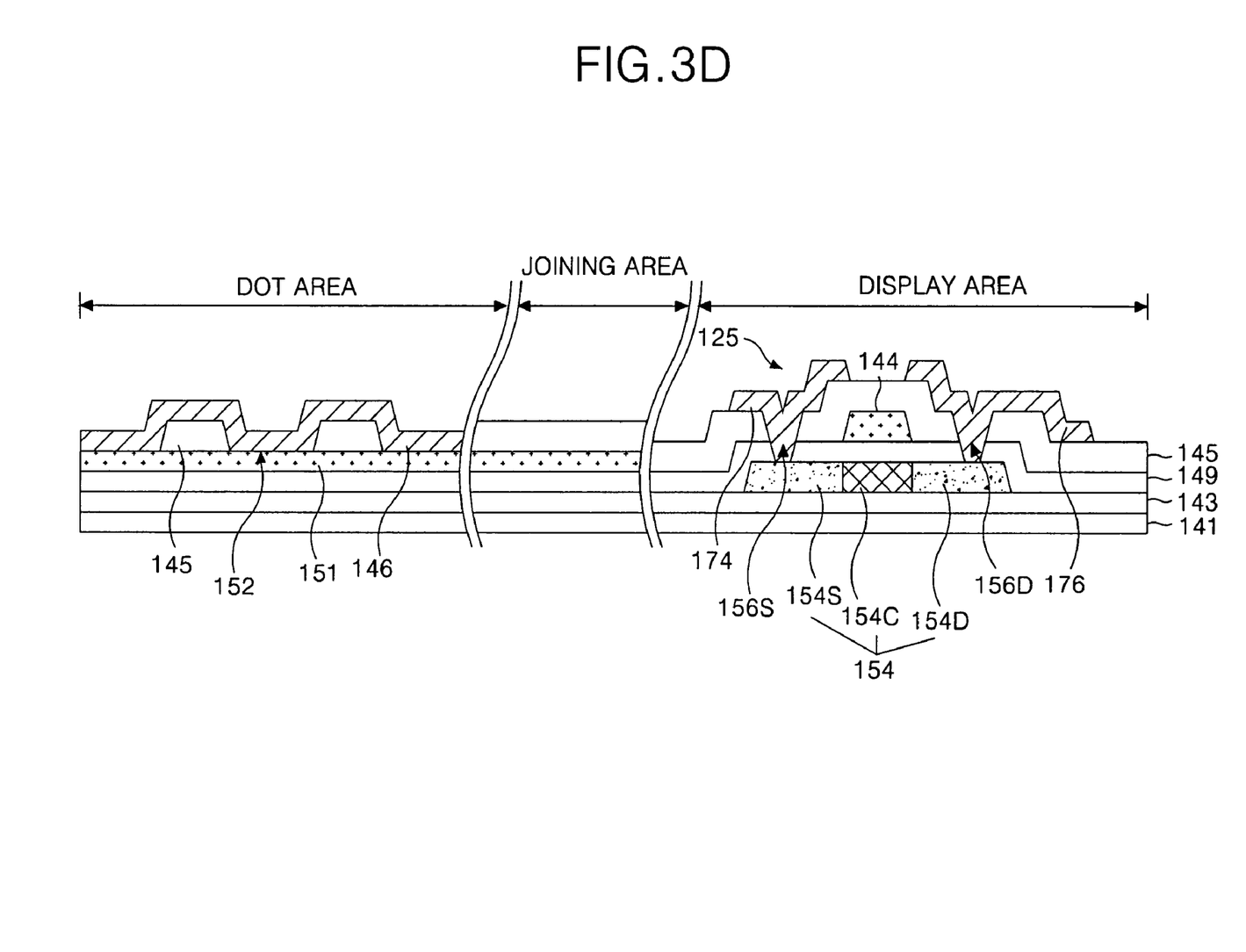

Referring to FIG. 3D, a second conductive pattern group including a data line (not shown), a source electrode 174, a drain electrode 176 and the middle pad electrode 146 may be formed on the inter layer dielectric 145.

After a source/drain metal layer is formed on the inter layer dielectric 145, the source/drain metal layer may be patterned by photolithography and etching, thereby providing the second conductive pattern group including the data line, the source electrode 174, the drain electrode 176 and the middle pad electrode 146.

The source electrode 174 and the drain electrode 176 may be connected, through the source and the drain contact hole 156S and 156D, to the source area 154S and the drain area 154D of the active layer 154, respectively. And, the middle pad electrode 146 may be connected, through the first pad contact hole 152, to the lower pad electrode 151.

Figure 3E:
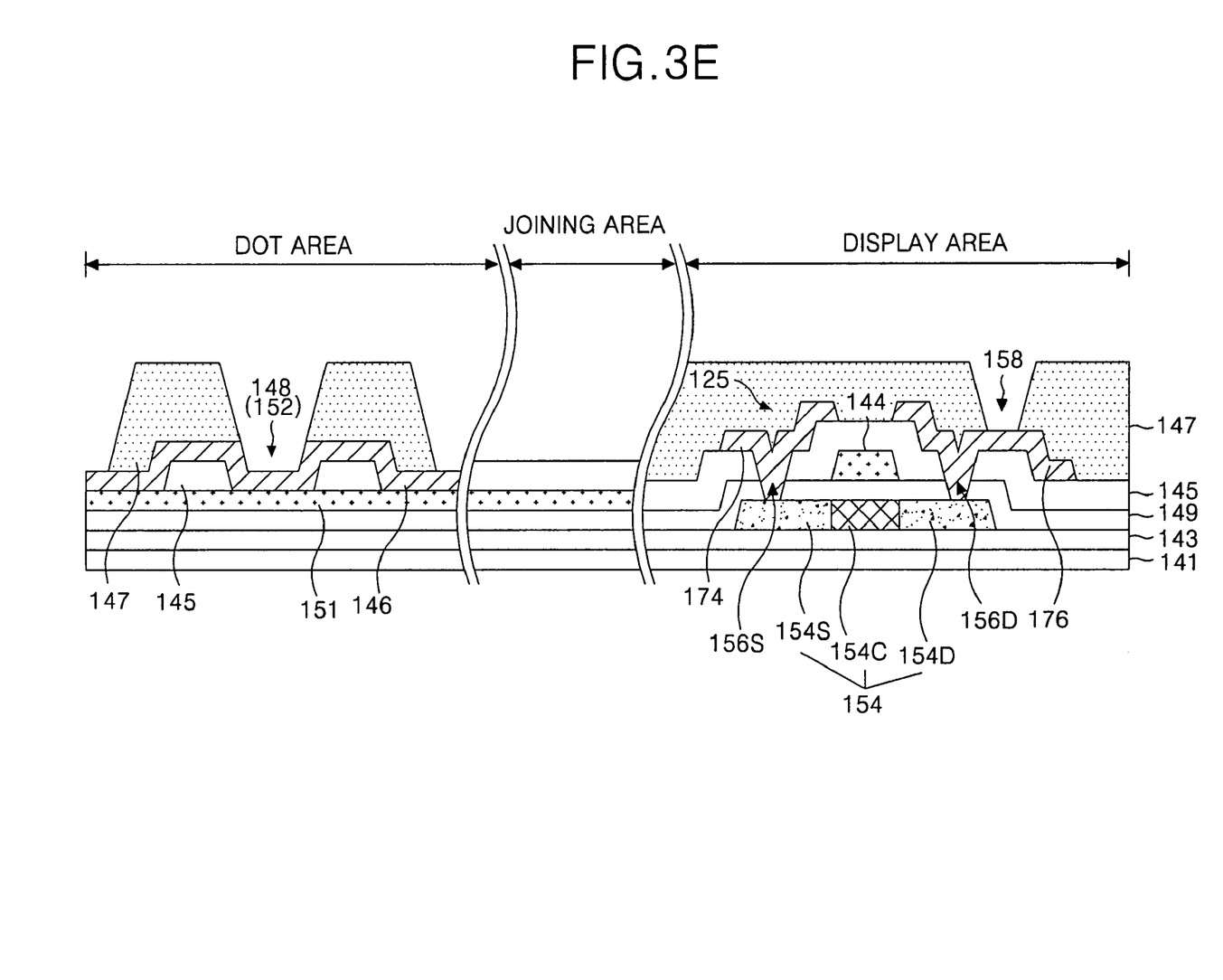

Referring to FIG. 3E, the organic protective film 147, and the pixel contact hole 158 and the second pad contact hole 148 passing through the organic protective film 147 are formed on the inter layer dielectric 145 provided with the second conductive pattern group.

The organic insulating material such as photo acryl, or other suitable material may be entirely disposed on the inter layer dielectric 145 provided with the second conductive pattern group, thereby resulting in the organic protective film 147.

Next, the pixel contact hole 158 and the second pad contact hole 148 passing through the organic protective film 147 may be formed by photolithography and etching.

The pixel contact hole 158 passes through the organic protective film 147 to expose the drain electrode 176. The second pad contact hole 148 passes through the organic protective film 147 to expose the middle pad electrode 146.

Figure 3F:
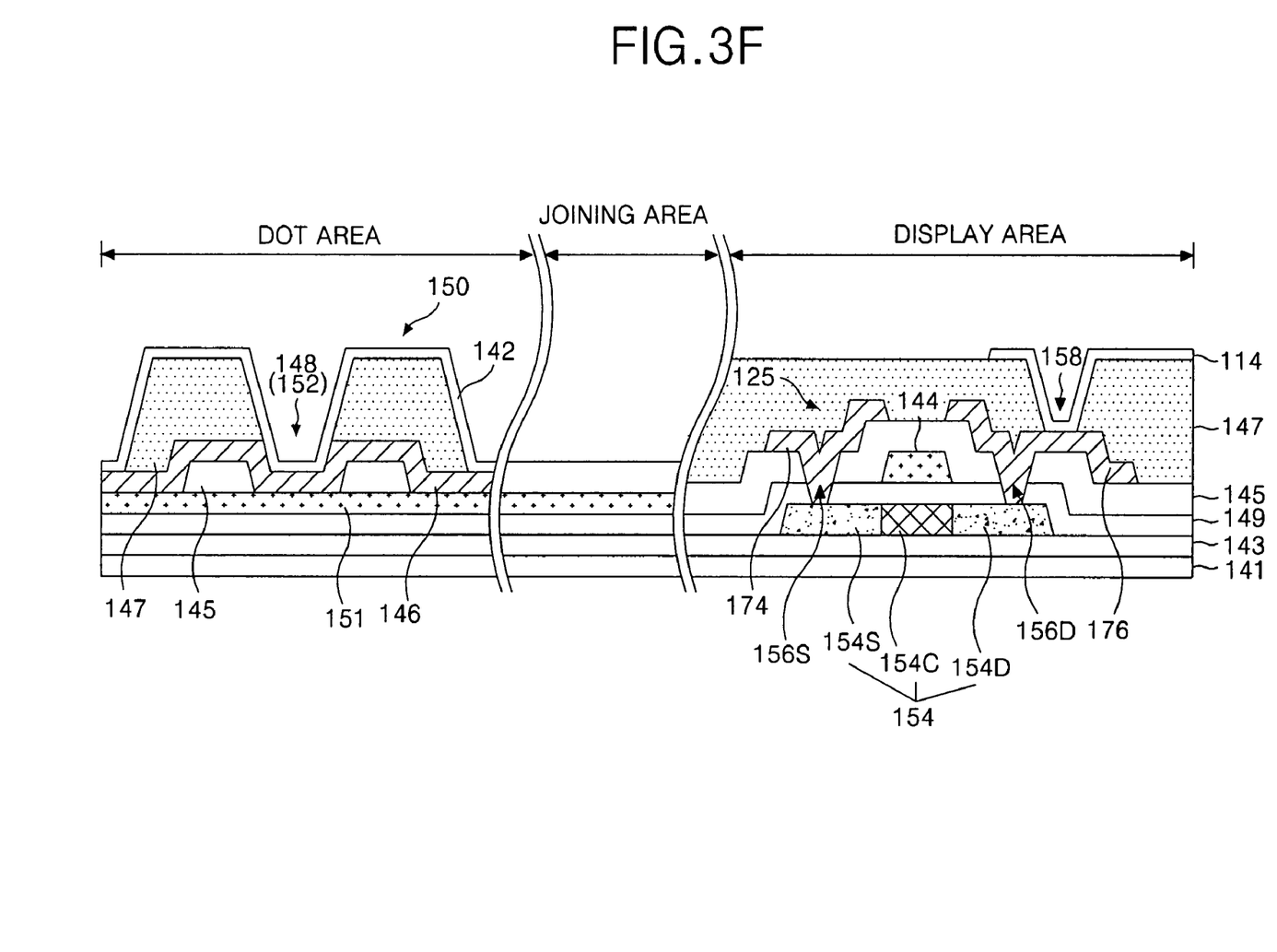

Referring to FIG. 3F, a third conductive pattern group including the pixel electrode 114 and the upper pad electrode 142 may be formed on the organic protective film 147.

After a transparent conductive layer, for example, ITO and IZO is disposed on the organic protective film 147, the transparent conductive layer may then be patterned by photolithography and etching, thereby resulting in the third conductive pattern group including the pixel electrode 114 and the upper pad electrode 142.

The third conductive pattern group, including the pixel electrode 114 and the upper pad electrode 142, may be formed on the organic protective film 147.

Figure 3G:
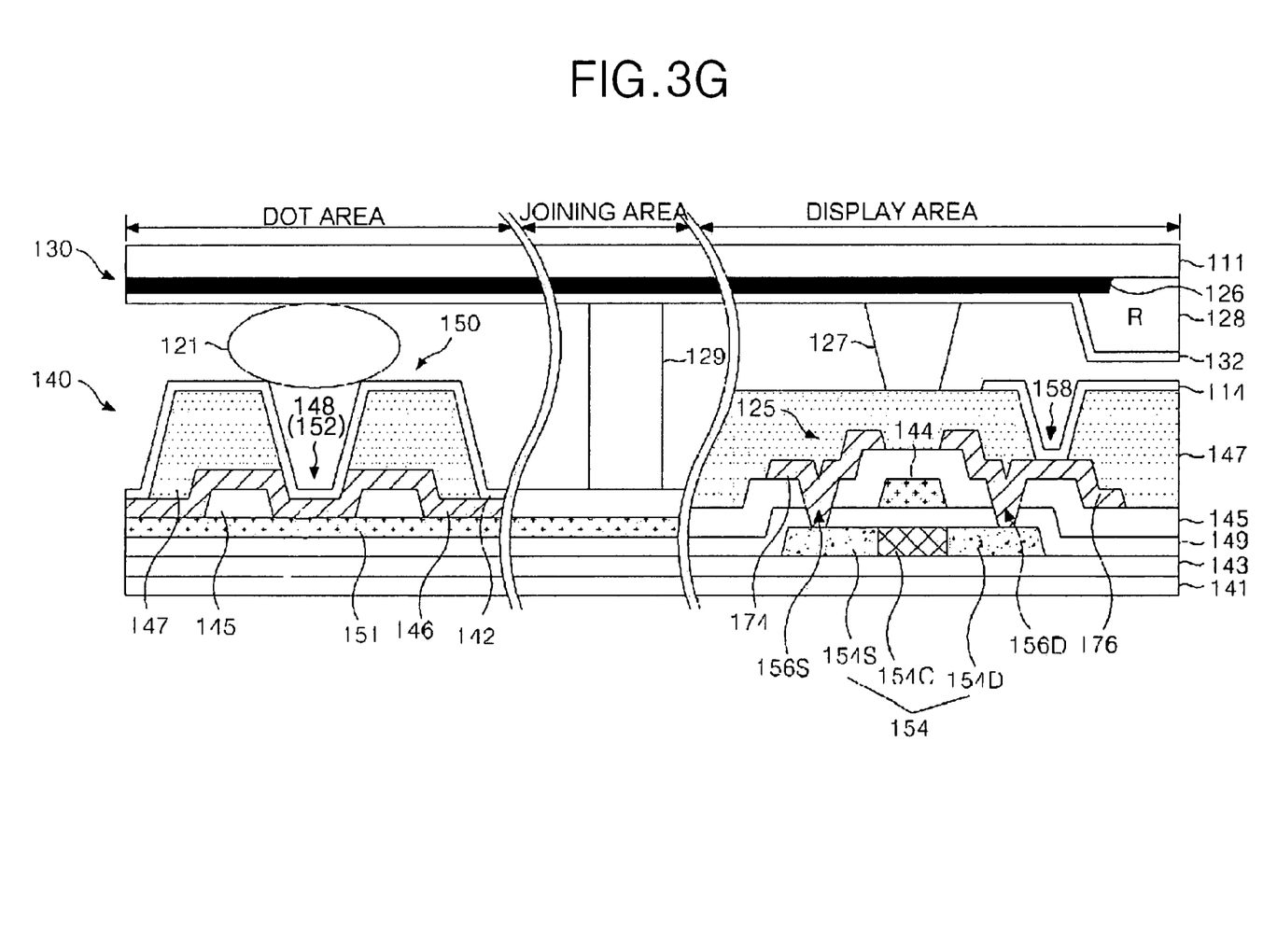

Referring to FIG. 3G, a separately prepared color filter substrate 130 and the thin film transistor substrate formed by the method as illustrated in FIGS. 3A through and including FIG. 3F are joined, thereby resulting in a complete liquid crystal display panel. In this instance, the common electrode 132 included in the color filter substrate 130 is connected, through the silver dot 121, to the common pad 150 included in the thin film transistor substrate 140.

Figure 4:
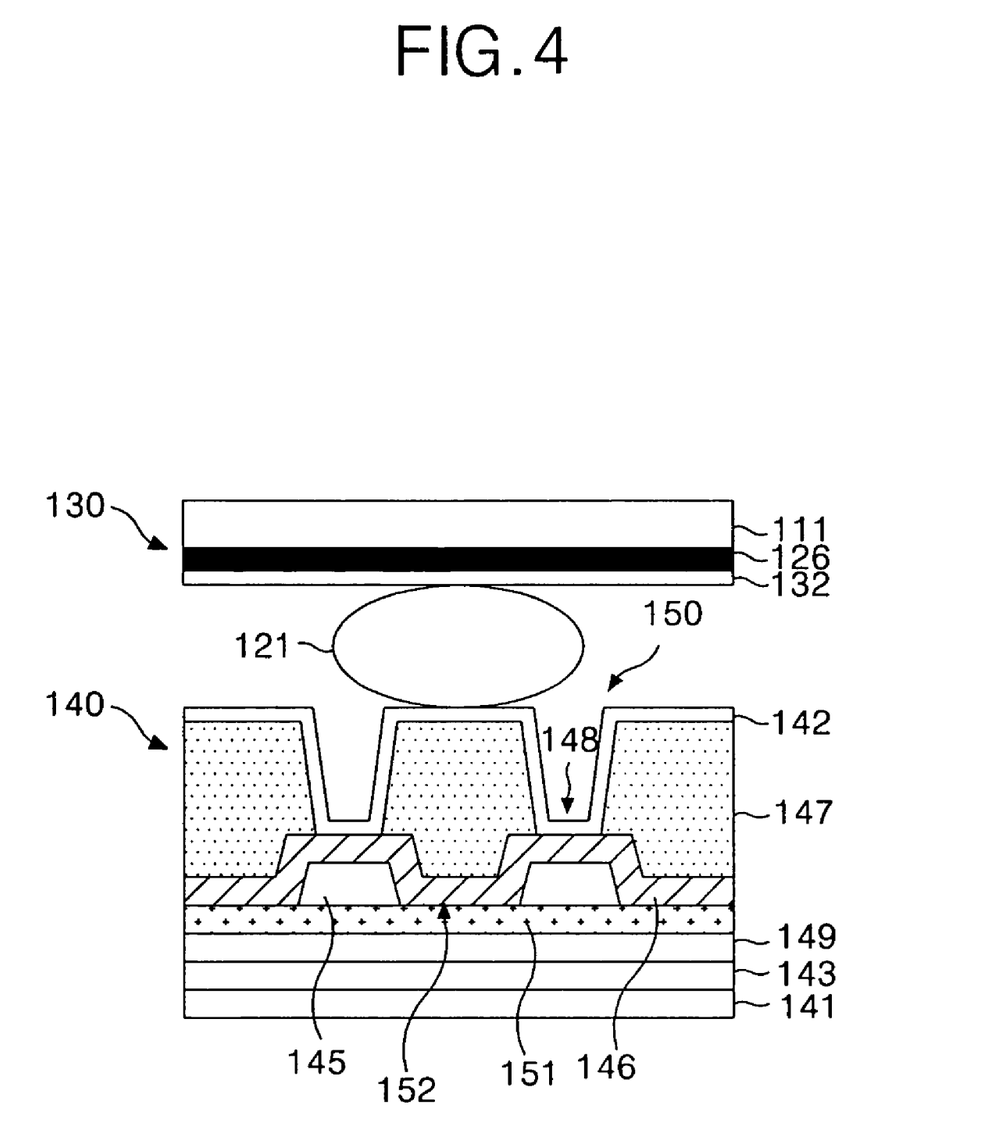
FIG. 4 is a sectional view showing a dot area of the liquid crystal display panel according to an embodiment of the present invention.

FIG. 4 is a sectional view showing the liquid crystal display panel according to an embodiment of the present invention.

Referring to FIG. 4, the liquid crystal display panel according to this embodiment of the present invention has the same elements as the liquid crystal display panel as illustrated in FIG. 3 except that there may be a plurality of second contact holes. Therefore, an explanation will be omitted.

The second pad contact hole 148 substantially exposes at least two areas of the middle pad electrode 146 by passing through the organic protective film 147. The silver dot 121 may be positioned at the upper pad electrode 142 between the second pad contact holes 148. In this instance, a contact area between the silver dot 121 and the upper pad electrode 142 when compared with the silver dot 121 of the structure shown in FIG. 3 overlapping with the second pad contact hole 148 is greater, so that contact resistance between them is reduced. Also, a contact area between the middle pad electrode 146 and the upper pad electrode 142 connected through the second pad contact hole 148 is greater, such that contact resistance between them is reduced. Accordingly, the common voltage is stably applied to the common electrode by the reduced contact resistance.

As described above, in a liquid crystal display panel according to this embodiment of the present invention, the organic protective film 147 may be formed at an area overlapping with the silver dot 121. The distance between the upper pad electrode 142 and the common electrode 132 reduced by the organic protective film 147. When the upper substrate 111 and the lower substrate 141 are joined, the silver dot 121 is fully and completely pressed so that the surface of the silver dot 121 contacts the upper pad electrode 142 and the common electrode 132 with as great an area as possible. As a result, resistance of the silver dot 121 can be minimized, so that distortion of the common voltage is reduced. Also, in the liquid crystal display panel according to this embodiment of the present invention, at least two second contact holes are formed. Accordingly, contact resistance between the silver dot 121 and the upper pad electrode 142, and a contact resistance between the upper pad electrode 142 and the middle pad electrode 146 are reduced, so that the common voltage can be stably applied to the common electrode 132.

Figure 5:
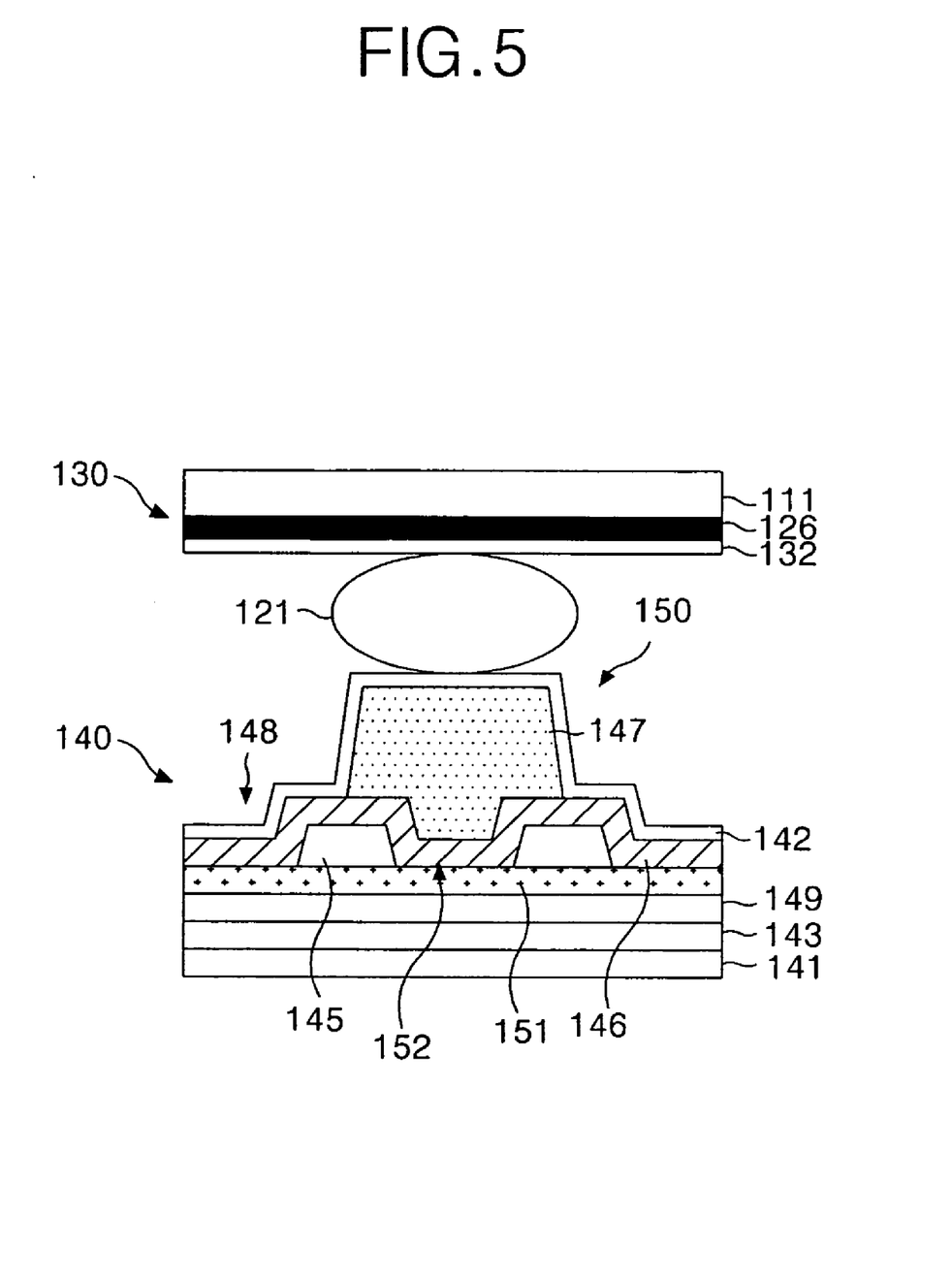
FIG. 5 is a sectional view showing a dot area of the liquid crystal display panel according to an embodiment of the present invention.

FIG. 5 is a sectional view showing the liquid crystal display panel according to an embodiment of the present invention.

Referring to FIG. 5, the liquid crystal display panel according to an embodiment of the present invention has the same elements as the liquid crystal display panel as illustrated in FIG. 3 except that the second contact hole may substantially expose an edge area of the middle pad electrode 146. Therefore, an explanation will be omitted.

The second pad contact hole 148 may substantially expose the edge area of the middle pad electrode 146 by passing through the organic protective film 147. Specifically, the second pad contact hole 148 substantially removes the organic protective film 147 of another dot area other than the organic protective film 147 of an area to be formed the silver dot 121 is formed. In this instance, a contact area between the silver dot 121 and the upper pad electrode 142 in comparison to the silver dot 121 of the structure as illustrated in FIG. 3 overlapping with the second pad contact hole 148 is greater such that contact resistance between them is reduced. Accordingly, the common voltage is stably applied to the common electrode by the reduced contact resistance.

As described above, in a liquid crystal display panel according to this embodiment of the present invention, the organic protective film 147 may be formed at an area overlapping with the silver dot 121. The distance between the upper pad electrode 142 and the common electrode 132 may be narrowed by the organic protective film 147. When the upper substrate 111 and the lower substrate 141 are joined, the silver dot 121 is fully and completely pressed so that the surface of the silver dot 121 contacting the pad upper electrode 142 and the common electrode 132 is as large as possible. As a result, a resistance of the silver dot 121 can be minimized, so that distortion of the common voltage is reduced. Also, in the liquid crystal display panel according to an embodiment of the present invention, at least two second contact holes are formed. Accordingly, contact resistance between the silver dot and the upper pad electrode is reduced, so that the common voltage can be stably applied to the common electrode.

On the other hand, the common pad of the liquid crystal display panel according to the present invention may be comprised of the lower pad electrode, the middle pad electrode and the upper pad electrode, or the common pad may be comprised of the middle pad electrode and the upper pad electrode without the lower pad electrode or may be comprised of the lower pad electrode and the upper pad electrode without the middle pad electrode or may be comprised of only the upper pad electrode.

Also, the liquid crystal display panel according to the present invention can be applicable to a polysilicon thin film transistor as well as an amorphous silicon thin film transistor.

Also, the protective film according to the present invention can be composed of at least one of an organic protective film and an inorganic protective film.

Also, the protective film according to the present invention can be composed of a plurality of layers.

As described above, according to the present invention, the organic protective film may be substantially formed at the dot area, so that height of the silver dot is reduced as much as a height of the organic protective film. Accordingly, according to the present invention, the contact surface of the silver dot with regard to the common electrode and upper pad electrode is maximized. Therefore, the electrical contact resistance of the silver dot is minimized. As a result, signal distortion of the common voltage due to contact resistance is reduced, and thus picture quality is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a common pad formed on a first substrate;
   a common electrode supplied with a common voltage through the common pad, on a second substrate opposite the first substrate;
   a conductive dot substantially formed between the common electrode and the common pad to electrically connect said common electrode and said common pad; and
   an organic protective film of a thickness such that a height of a space between said common pad and said common electrode is minimized, wherein the organic protective film is formed at an area other than a joining area where the first substrate and the second substrate are joined.

2. The liquid crystal display panel as claimed in claim 1, wherein said common pad comprises:
   a first pad electrode formed on the first substrate;
   the organic protective film covering the first pad electrode;
   a first pad contact hole substantially passing through the organic protective film to expose the first pad electrode; and
   a second pad electrode connected, through the first pad contact hole, to the first pad electrode, and substantially formed on the organic protective film.

3. The liquid crystal display panel as claimed in claim 2, wherein at least one first pad contact hole is formed at an area substantially overlapping the conductive dot.

4. The liquid crystal display panel as claimed in claim 2, wherein at least one first pad contact hole is substantially formed at an area not overlapped with the conductive dot.

5. The liquid crystal display panel as claimed in claim 2, wherein said first pad contact hole substantially exposes an edge portion of the first pad electrode.

6. The liquid crystal display panel as claimed in claim 2, wherein said common pad further comprises:
   a third pad electrode substantially formed between the first substrate and the first pad electrode;
   at least one insulating layer to cover the third pad electrode; and
   a third pad contact hole substantially passing through the insulating layer to connect the first pad electrode and the third pad electrode.

7. The liquid crystal display panel as claimed in claim 6, further comprising:
   a pixel electrode to provide a substantially vertical electric field in conjunction with the common electrode on the first substrate;
   a thin film transistor connected to the pixel electrode, and protected by the organic protective film;
   a gate line connected to a gate electrode of the thin film transistor; and
   a data line connected to a source electrode of the thin film transistor.

8. The liquid crystal display panel as claimed in claim 7, wherein said at least one insulating layer is formed between the gate line and the data line.

9. The liquid crystal display panel as claimed in claim 1, further comprising:
   an adhesive for joining the first substrate and the second substrate, and wherein the organic protective film is formed on the first substrate at an area other than where the adhesive is formed.

10. A method of fabricating a liquid crystal display panel, comprising:
    preparing a color filter substrate comprising a common electrode formed on an upper substrate;
    preparing a thin film transistor substrate comprising an organic protective film formed at an area other than a joining area where the upper substrate and a lower substrate are joined, a pixel electrode opposite the common electrode on the organic protective film, and a common pad formed on the organic protective film, and for supplying a common voltage to the common electrode; and
    forming a conductive dot for electrically connecting the common electrode and the common pad between the thin film transistor substrate and the color filter substrate with a distance reduced by a thickness of the organic protective film.

11. The method as claimed in claim 10, wherein preparing the thin film transistor substrate comprises:
    forming a first pad electrode on the lower substrate;
    forming the organic protective film to substantially cover the first pad electrode;
    forming a first pad contact hole passing through the organic protective film to substantially expose the first pad electrode; and
    forming a second pad electrode connected, through the first pad contact hole, to the first pad electrode, and connected to the conductive dot on the organic protective film.

12. The method as claimed in claim 11, wherein at least one first pad contact hole is formed at an area overlapping with the conductive dot.

13. The method as claimed in claim 11, wherein at least one first pad contact hole is formed at an area not overlapping the conductive dot.

14. The method as claimed in claim 11, wherein said first pad contact hole substantially exposes an edge portion of the first pad electrode.

15. The method as claimed in claim 11, further comprising:
   forming a third pad electrode substantially between the lower substrate and the first pad electrode;
   forming at least one insulating layer to substantially cover the third pad electrode; and
   forming a third pad contact hole passing through the insulating layer to connect the first pad electrode and the third pad electrode.

16. The method as claimed in claim 15, wherein a step of preparing a thin film transistor substrate comprises:
   forming a data line connected to a source electrode of a thin film transistor; and
   forming a gate line connected to a gate electrode of the thin film transistor;

17. The method as claimed in claim 16, wherein said at least one insulating layer is formed between the gate line and the data line.

18. A method of fabricating a liquid crystal display panel as claimed in claim 10, further comprising:
   joining the thin film transistor substrate with the color filter substrate using an adhesive formed at an area not overlapping with the organic protective film.

* * * * *